Patented Apr. 16, 1946

2,398,613

UNITED STATES PATENT OFFICE 2,398,613

PURIFICATION OF LATEX

Hendrik Roeloff Braak, Batavia-Centrum, Java, Dutch East Indies, assignor, by mesne assignments, to P. Honig, Washington, D. C., Commissioner of the Board for Economic and Financial Affairs of The Netherlands Indies, Surinam and Curaçoa, as trustee No Drawing. Application November 16, 1940, Serial No. 366,009. In the Netherlands October 30, 1939

9 Claims. (Cl. 260—816)

This invention relates to purification of latex; and it comprises a method of purifying latices of rubber, gutta percha, balata, jelutong, abiurana, gondang and the like, said method comprising subjecting such a latex to a treatment with alkali for purification purposes, separating the impurities of high specific gravity precipitated by the alkali, this separation being usually accomplished by the use of a centrifuge or by settling, whereby metallic compounds and other impurities are substantially eliminated, this resulting in the production of a latex of enhanced purity, greater stability and of more constant composition; said separating step being advantageously conducted while the latex is heated, being sometimes conducted in an inert atmosphere and being followed usually by dialysis of the latex to further increase its purity; all as more fully hereinafter set forth and as claimed.

A well known method for the purification of latex consists in treating the latex with alkali, preferably at elevated temperatures eventually followed by other operations. My prior copending application, Serial No. 281,264, filed June 26, 1939, describes such a treatment, comprising the heating of latex under normal pressure with a caustic lye at boiling temperature, followed by dialysis of the alkali-treated latex. By the latter process two distinct advantages are obtained; viz, not only is a latex obtained which is much purer than the original latex, but, in addition, it has been found that the composition (nitrogen-content, ash-content, etc.) and properties of this purified latex, as well as the rubber obtained therefrom by coagulation (e. g. its resistance to water absorption) are far less dependent upon varying factors such as the system of tapping employed, the climatological and soil conditions, season, type and age of the trees, etc., than in the case of untreated latex. In brief, the said process acts as an effective method of rendering latices uniform.

However it has been observed that under certain circumstances minor variations in the composition of the purified latex as obtained by said process are sometimes still met with, especially during certain seasonal variations. It is known that the Hevea tree reacts to these variations in a physiological manner, yielding during those periods a latex of abnormal composition (particularly a high nitrogen and ash-content). This is particularly true for the period of leaf-fall (see also Norman Rae in "The Analyst," 53, p. 330; "Seasonal variations in the composition of the latex of Hevea brasiliensis"). Under these exceptional circumstances, certain variations occur, even in the latex obtained according to my acknowledged application, Serial Number 281,264. These variations, although small in comparison with the variations in the original latex, are beyond the variations which are to be considered as "normal" for this purified latex. For instance, it was observed that the nitrogen-content in the crepe prepared from such a purified latex may under those circumstances rise to 0.14 per cent–0.15 per cent instead of the usual 0.08–0.10 per cent. Similarly the ash-content may rise to 0.16 per cent instead of the usual 0.10 per cent.

While investigating this matter, it was found that the treatment of the latex with alkali, especially at elevated temperatures approaching its boiling point, causes a certain portion of the non-rubber constituents, inorganic as well as organic (including nitrogen-containing compounds) to be precipitated in an insoluble or less soluble form; it was also found that the higher the original content of non-rubber constituents in the latex, the larger in general the precipitate. The latter is, e. g. the case in the period of, or preceding, the leaf fall of the Hevea.

Further investigation showed that the quality of such latex, after such treatment with alkali, can be improved by the elimination of said precipitated substances by a method based on their differences in specific gravity as compared with the liquid. This elimination can be accomplished by mere settling. However, it has proved preferable to perform the elimination in a clarifying centrifuge and at temperatures approaching its boiling point, since by the latter method additional substances can be eliminated which by their specific gravity or fineness settle very incompletely or slowly. Any type of suitable centrifuge built for the separation of solid particles from a liquid, may be used, provided the construction is such that no difficulties, caused by the coagulation of rubber from the latex, occur. The absorption of air by the latex during the operation should be avoided as far as possible. If desired the separation may be carried out in a closed centrifuge in an atmosphere of nitrogen or other inert gas, although in general this precaution is not necessary.

Further it was found that the solid matter separated in the centrifuge often contains metallic compounds known to unfavorably influence the aging and other properties of rubber, such as copper, manganese, iron, etc. Apparently the metallic compounds in the original latex are converted during the alkali-treatment either partially or completely into insoluble compounds so that they are precipitated in the centrifuge. Consequently, the elimination of these insoluble or less soluble compounds results in a latex which is purer, more stable and of a more constant composition than a similar latex which has not been subjected to clarification.

Although several methods of treating latex with alkali have been described in the current literature, none of these suggests the elimination of the insoluble compounds which are formed during the alkali treatment.

The latex obtained by the process according to the present invention is a very suitable starting material for various applications. For example, this latex may be submitted advantageously to the process of dialyzing as described in my acknowledged application. It has been found that, by centrifuging the latex after treatment with lye and then dialyzing, it is possible to obtain a normal latex even in the abnormal periods of seasonal variations. It has also been found that latex tapped in normal seasons is improved, especially with respect to its nitrogen and ash contents in the crepe obtained by coagulation, and a better resistance against water absorption in the latter.

In a specific embodiment of this invention, which represented a practical operation, I first passed a fresh latex through a screen to remove dirt and the larger impurities. This latex was then mixed with a solution of sodium hydroxide, having a concentration of 33 per cent by weight, in the proportions of 30 parts by weight of solution to 1000 parts by weight of the latex. Steam was then passed into the mixture to hold it at boiling temperature for a period of 2 hours. The so-treated latex was then passed directly through a centrifuge, while still at an elevated temperature, and a small fraction of heavy material was removed, this fraction containing the impurities precipitated in the caustic treatment. The centrifuged latex was then diluted to a solids content of 20 per cent and the diluted latex was heated again to its boiling point and passed through seamless Cellophane tubing in a dialyzing apparatus in counterflow to a stream of water maintained at substantially its boiling point. The so-purified latex was then diluted to a concentration of about 5 per cent and subsequently coagulated with a weak acid, the coagulum being worked up into crepe rubber.

It has been found that removal of the heavy impurities precipitated in the caustic treatment results in the elimination of many of the difficulties which are normally encountered in the dialyzing step of purifying latex. It has been found that these difficulties are caused by the clogging of the dialyzing tubes, not only by the settling and accumulation of the heavy impurities in the tubes but also owing to the fact that these impurities promote local coagulation of the latex, resulting in the plugging of the tubes. The present invention avoids these difficulties by removal of the heavy impurities prior to the dialyzing step.

While I have described what I believe to be the best embodiments of my process, it is obvious that various modifications can be made in the specific procedures described without departing from the purview of this invention. Many such modifications which fall within the scope of the following claims will be immediately evident to those skilled in this art.

What I claim is:

1. In the purification of latices of rubber, balata, gutta percha, jelutong, abiurana, gondang and the like, the process which comprises treating such a latex with a dilute caustic alkali at elevated temperatures approaching its boiling point to cause a precipitation of heavy impurities therein, separating a small fraction containing said heavy impurities without substantial change in the rubber content of the latex, and then dialyzing the so-purified latex to further purify the same.

2. The process of claim 1 wherein the dialyzing treatment is at temperatures approaching the boiling point of the latex.

3. The process of claim 1 wherein said small fraction containing heavy impurities is separated at elevated temperatures approaching the boiling point of the latex.

4. The process of claim 1 wherein the treatment with alkali and the dialyzing treatment are conducted at elevated temperatures approaching the boiling point of the latex.

5. The process of claim 1 wherein the alkali treatment, the separation of heavy impurities and the dialyzing treatment are conducted at elevated temperatures approaching the boiling point of the latex.

6. The process of claim 1 wherein the separation of heavy impurities is conducted in the presence of an inert atmosphere.

7. In the purification of latices of rubber, balata, gutta percha, jelutong, abiurana, gondang and the like, the process which comprises boiling such a latex in contact with a dilute caustic alkali for a time sufficient to cause the precipitation of heavy impurities, centrifuging said latex to remove a small fraction containing said heavy impurities without substantial change in the rubber content of the latex, then dialyzing the latex at elevated temperatures approaching its boiling point to further purify the same.

8. In the purification of latices of rubber, balata, gutta percha, jelutong, abiurana, gondang and the like, the process which comprises boiling such a latex in contact with a dilute caustic alkali for a time sufficient to produce the precipitation of heavy impurities, centrifuging said latex at temperatures approaching its boiling point to separate a small fraction containing said heavy impurities without substantial change in the rubber content of the latex, then dialyzing the latex at elevated temperatures approaching its boiling point.

9. In the purification of rubber latex, the process which comprises mixing a rubber latex with a caustic soda solution in proportions to provide about 30 parts by weight of a solution containing about 33 per cent of caustic soda to about 1000 parts by weight of the latex, boiling the resulting mixture for about 2 hours, passing the resulting product directly to a centrifuge and separating a small fraction containing the heavy impurities precipitated by the caustic treatment, diluting the so treated latex to a solids content of approximately 20 per cent, heating the latex approximately to its boiling point and dialyzing it in tubes of Cellophane in counterflow to a stream of water maintained substantially at its boiling point to further purify the latex.

HENDRIK ROELOFF BRAAK.